US008214675B2

(12) United States Patent  
Challener et al.

(10) Patent No.: US 8,214,675 B2  
(45) Date of Patent: Jul. 3, 2012

(54) APPARATUS, SYSTEM, AND METHOD FOR POWER MANAGEMENT UTILIZING MULTIPLE PROCESSOR TYPES

(75) Inventors: David Carroll Challener, Raleigh, NC (US); Daryl Cromer, Cary, NC (US); Howard Locker, Cary, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 810 days.

(21) Appl. No.: 12/330,332

(22) Filed: Dec. 8, 2008

(65) Prior Publication Data

US 2010/0146317 A1 Jun. 10, 2010

(51) Int. Cl.  
*G06F 1/00* (2006.01)

(52) U.S. Cl. .............................................. 713/324

(58) Field of Classification Search ........... 713/300–340  
See application file for complete search history.

(56) References Cited

U.S. PATENT DOCUMENTS

| | | | | |
|---|---|---|---|---|
| 5,532,935 A * | 7/1996 | Ninomiya et al. | ........... | 700/296 |
| 5,913,068 A * | 6/1999 | Matoba | ........... | 713/322 |
| 5,944,828 A * | 8/1999 | Matsuoka | ........... | 713/323 |
| 6,035,408 A * | 3/2000 | Huang | ........... | 713/320 |
| 6,092,207 A * | 7/2000 | Kolinski et al. | ........... | 713/323 |
| 6,209,105 B1 * | 3/2001 | Hamamoto | ........... | 713/300 |
| 6,240,521 B1 * | 5/2001 | Barber et al. | ........... | 713/323 |
| 6,408,397 B1 * | 6/2002 | Alexander et al. | ........... | 713/340 |
| 6,501,999 B1 * | 12/2002 | Cai | ........... | 700/82 |
| 6,631,474 B1 * | 10/2003 | Cai et al. | ........... | 713/300 |
| 7,349,762 B2 * | 3/2008 | Omizo et al. | ........... | 700/278 |
| 7,457,975 B2 * | 11/2008 | Taniguchi et al. | ........... | 713/324 |
| 7,496,773 B2 * | 2/2009 | Umehara et al. | ........... | 713/320 |
| 7,539,883 B2 * | 5/2009 | Kojou et al. | ........... | 713/320 |
| 7,596,705 B2 * | 9/2009 | Kim | ........... | 713/300 |
| 7,779,287 B2 * | 8/2010 | Lim et al. | ........... | 713/500 |
| 7,814,343 B2 * | 10/2010 | Kanno et al. | ........... | 713/300 |
| 7,831,850 B2 * | 11/2010 | LeProwse et al. | ........... | 713/320 |
| 7,925,900 B2 * | 4/2011 | Parks et al. | ........... | 713/300 |
| 2002/0095609 A1 * | 7/2002 | Tokunaga | ........... | 713/300 |
| 2005/0114722 A1 * | 5/2005 | Tanaka et al. | ........... | 713/320 |
| 2005/0166078 A1 * | 7/2005 | Taniguchi et al. | ........... | 713/330 |
| 2006/0271797 A1 * | 11/2006 | Ginggen et al. | ........... | 713/300 |
| 2010/0005235 A1 * | 1/2010 | Yang | ........... | 711/105 |

* cited by examiner

*Primary Examiner* — Paul R Myers  
(74) *Attorney, Agent, or Firm* — Kunzler Law Group

(57) ABSTRACT

An apparatus, system, and method are disclosed for computer system power management. A control module 602 is activated on a computer 200 in response to an event and enters 818 a standby state if the computer 200 is not already 814 in the standby state. A policy module 604 detects 904 a power source of a predetermined type connected to the computer 200 and dictates 908 one or more processors 302 of higher power consumption for a more abundant type of power source such as an AC adapter 314, or one or more processors 304 of lower power consumption for a less abundant type of power source such as a battery 318. A configuration module 606, activated by the control module 602, switches 1004 the computer 200 to one or more processors 302 and 304 of a predetermined power consumption as dictated and exits 1016 the standby state.

24 Claims, 8 Drawing Sheets

APPARATUS, SYSTEM, AND METHOD FOR POWER MANAGEMENT UTILIZING MULTIPLE PROCESSOR TYPES

BACKGROUND

1. Field

This invention relates to computer system configuration management and more particularly relates to power management.

2. Description of the Related Art

A computer is a complex system, frequently requiring configuration management to optimize operational efficiency. Efficient power utilization is one important dimension of computer operation, both to reduce cost and to minimize the environmental impact.

Power management becomes particularly important for a portable computer, such as a notebook, which must often rely upon a power source of limited capacity, such as a battery. Some strategies have been developed to try to address the problem, including temporarily shutting down unused circuitry, throttling the clock rate, and the like. Nevertheless, longer battery life for mobile computing remains an elusive goal.

SUMMARY

From the foregoing discussion, it should be apparent that a long-felt unmet need exists for an apparatus, system, and method that reduce computer power consumption. Beneficially, such an apparatus, system, and method would maintain computer performance at an acceptable level given the power available.

The present invention has been developed in response to the present state of the art, and in particular, in response to the problems and needs in the art that have hitherto proven intractable under currently available power management strategies. Accordingly, the present invention has been developed to provide an apparatus, system, and method for power management that overcome many or all of the above-discussed shortcomings in the art.

Low-power processors exist which might be used to extend battery life in mobile computing systems, but the performance is inadequate for some more demanding applications. Such processors may also employ non-industry-standard instruction set architectures which are natively incapable of running the most widely used personal computer applications.

The present invention takes the novel approach of incorporating both standard high-power processors and less widely applicable low-power processors in the same computer. An ability is provided to switch between processor types, both automatically and under user control, to meet the changing demands of performance and power consumption.

When the computer is running on battery power, the low-power processor may be selected as the default configuration. When the computer is docked or otherwise running on AC power, then the high-power processor may be configured in its place, permitting a wider range of more demanding applications to be run. The user would have the ability to alter these defaults, and to override them in a given instance as desired. For example, the user may wish to run a high-performance application while on the road, when AC power is not readily available. Conversely, the user may wish to conserve power when less demanding applications are being run, even when the computer, mobile or otherwise, is running on AC power, so as to save cost and be more environmentally responsible.

The capability of the low-power processor to run a wide array of industry-standard applications may be further enhanced by means of efficient emulation, such as dynamic binary translation.

The apparatus to manage power is provided with a plurality of modules configured to functionally execute the necessary steps of entering a standby state, detecting a power source of a predetermined type, switching to one or more processors of a predetermined power consumption as dictated by a power policy, and exiting the standby state. It should be noted that entering and exiting the standby state each comprises a transitional state, all or a portion of which may be considered as part of the standby state proper. These modules in the described embodiments include a control module, a policy module, and a configuration module, all or a portion of which may operate within or without the standby state as defined.

The apparatus, in one embodiment, is configured to enter standby state in response to an event, including a change of the power source, a timing condition, an operating system condition, a firmware condition, an SMI, a user action, and so forth.

The apparatus is further configured, in one embodiment, to permit the user to override the power policy. The override would not change the underlying policy, but merely permit exceptions as explicitly dictated by the user in a specific instance. The power policy itself may also be changed by the user as desired.

In a further embodiment, the apparatus may be configured to run in the framework of a software stack on the computer. The control module may comprise a background application. The policy module may comprise operating system power properties. The configuration module may comprise table-driven firmware.

A system of the present invention is also presented to manage power. The system may be embodied as a computer having two or more processors of differing power consumption, the control module, the policy module, wherein the power policy dictates one or more processors of higher power consumption for a more abundant type of power source and dictates one or more processors of lower power consumption for a less abundant type of power source, and the configuration module. In particular, the system, in one embodiment, includes an AC adapter as the more abundant type of power source and a battery as the less abundant type of power source.

The system may further include emulation where necessary to achieve binary compatibility of the two or more processors of differing power consumption. A high-power processor may have a very different architecture than a low-power processor. Emulation permits each processor to appear the same to the software stack of the computer.

In a further embodiment, the computer may comprise a notebook. The event triggering activation of the foregoing modules may comprise closing and opening the lid of the notebook.

A method of the present invention is also presented for power management. The method in the disclosed embodiments substantially includes the steps necessary to carry out the functions presented above with respect to the operation of the described apparatus and system. In one embodiment, the method includes detecting a power source of a predetermined type connected to the computer, and switching to one or more processors of a predetermined power consumption as dictated by the power policy for the power source. The method also may include entering the standby state if the computer is not already in the standby state, and exiting the standby state.

In a further embodiment, the method may be activated in response to an event, including those aforementioned, such as a user action. The power policy may also be overridden by the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
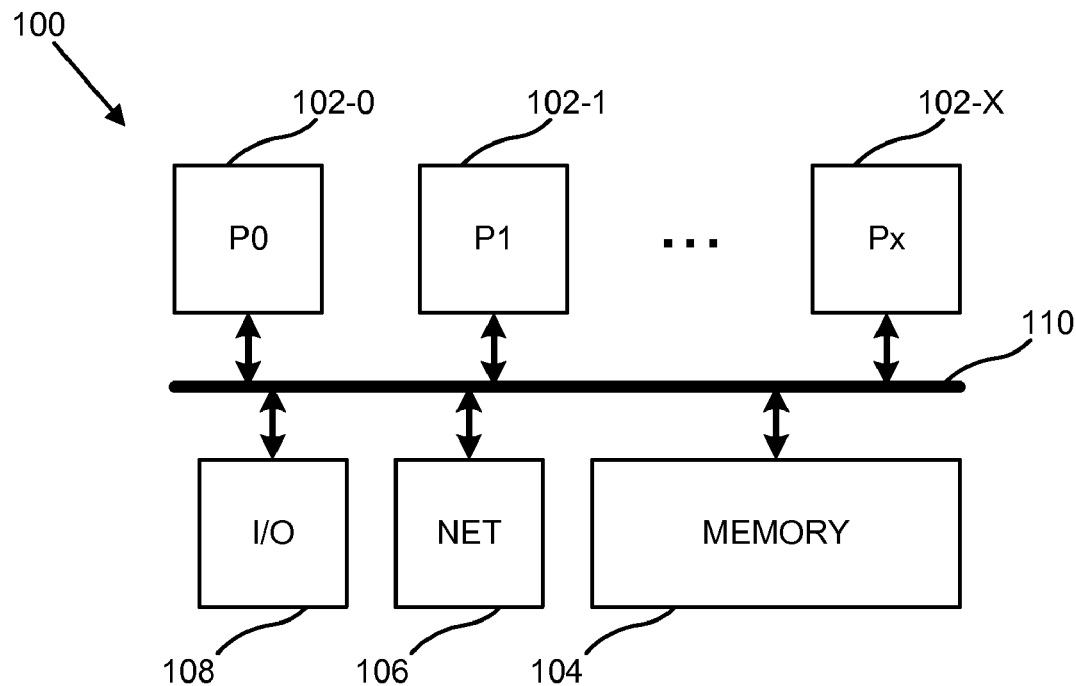
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
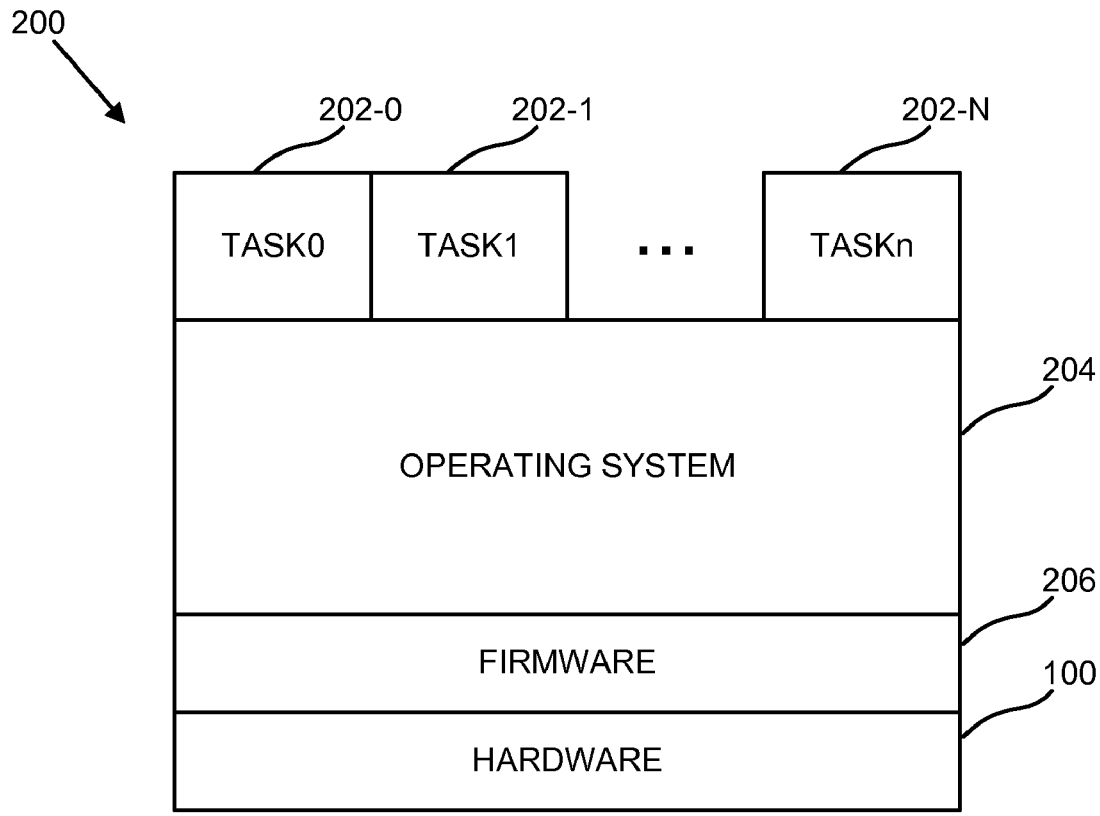
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
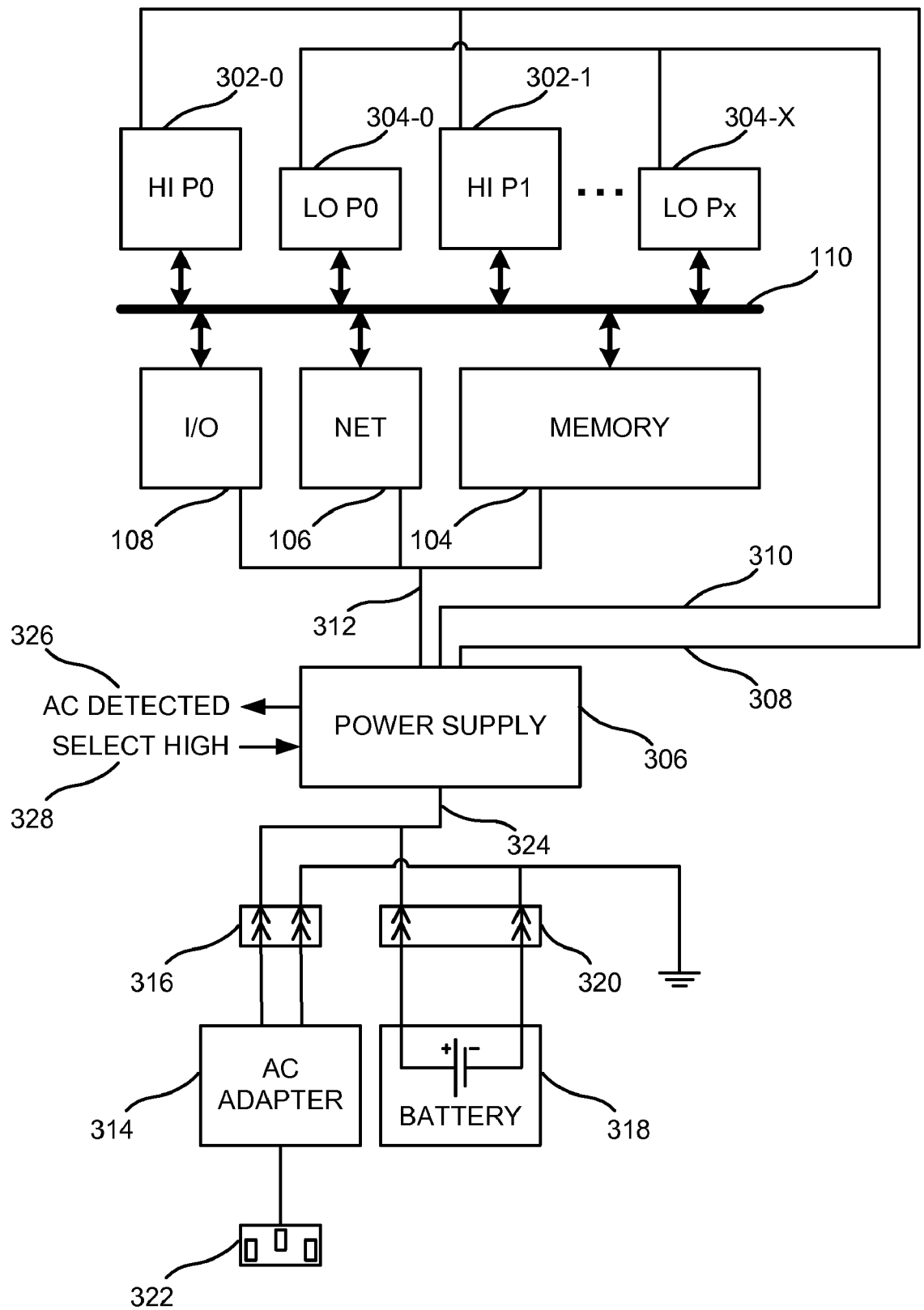
FIG. 3 is a more detailed schematic block diagram of the hardware platform illustrating differing types of processors and power sources according to the present invention.

FIG. 3 is a more detailed schematic block diagram of the hardware platform 100 illustrating differing types of processors and power sources according to the present invention. Two types of processors 102 are shown, including a high-power processor 302 and a low-power processor 304. In a further embodiment, there may be additional types of processors 102 having differing predetermined levels of power consumption. A one-to-one correspondence may exist between processors 102 of each type. For example, high-power processor 302-0 may be interchangeable with low-power processor 304-0 and so forth.

The components of the hardware platform 100 receive power from a power supply 306. The high-power processors 302 receive power through a high-power line 308. The low-power processors 304 receive power through a low-power line 310. The remaining components, including the memory 104, network interface 106, and input/output device interface 108, receive power through a power line 312.

The power supply 306 in turn may receive power from up to two or more predetermined types of power sources. In the example shown, one type of power source may be an AC adapter 314, which may be connected to the power supply 306 through an adapter connector 316. Another type of power source may be a battery 318, connected to the power supply 306 through a battery connector 320. The AC adapter 314, which in turn receives power from an electric outlet 322 such as may be served by a commercial electric utility, would likely be a more abundant type of power source than the battery 318, in terms of the average period of time over which a given level of power may be reliably and continuously delivered. By its very nature, the power deliverable from a battery 318 is limited by its finite storage capacity, making it a less abundant type of power source. Other types of power sources of differing abundance, such as photovoltaic arrays, fuel cells, and so forth, may also be employed.

The power supply 306 is able to detect which power source is connected to it based upon an input DC voltage 324. The AC adapter 314 yields a higher DC voltage than the battery 318, effectively overriding it even if the battery 318 is also connected to the power supply 306. In that case, some current will flow from the AC adapter 314 to recharge the battery 318 through a recharge circuit (not shown). If the AC adapter 314 is connected, the power supply asserts an AC-detected signal 326. If only the battery 318 is connected, then the AC-detected signal 326 is not asserted.

The power supply 306 is also responsive to a select-high signal 328. If the select-high signal 328 is asserted, then the high-power line 308 is enabled and the low-power line 310 is disabled, such that only the high-power processors 302 are powered and operative. If the select-high signal 328 is not asserted, then the low-power line 308 is enabled and the high-power line 310 is disabled, such that only the low-power processors 304 are powered and operative. The power supply 306 incorporates DC-DC converters to convert in the input DC voltage 324 to the required voltage levels for the high-power line 308, the low-power line 310, the power line 312, and any other DC voltages as may be required by the hardware platform 100.

Figure 4:
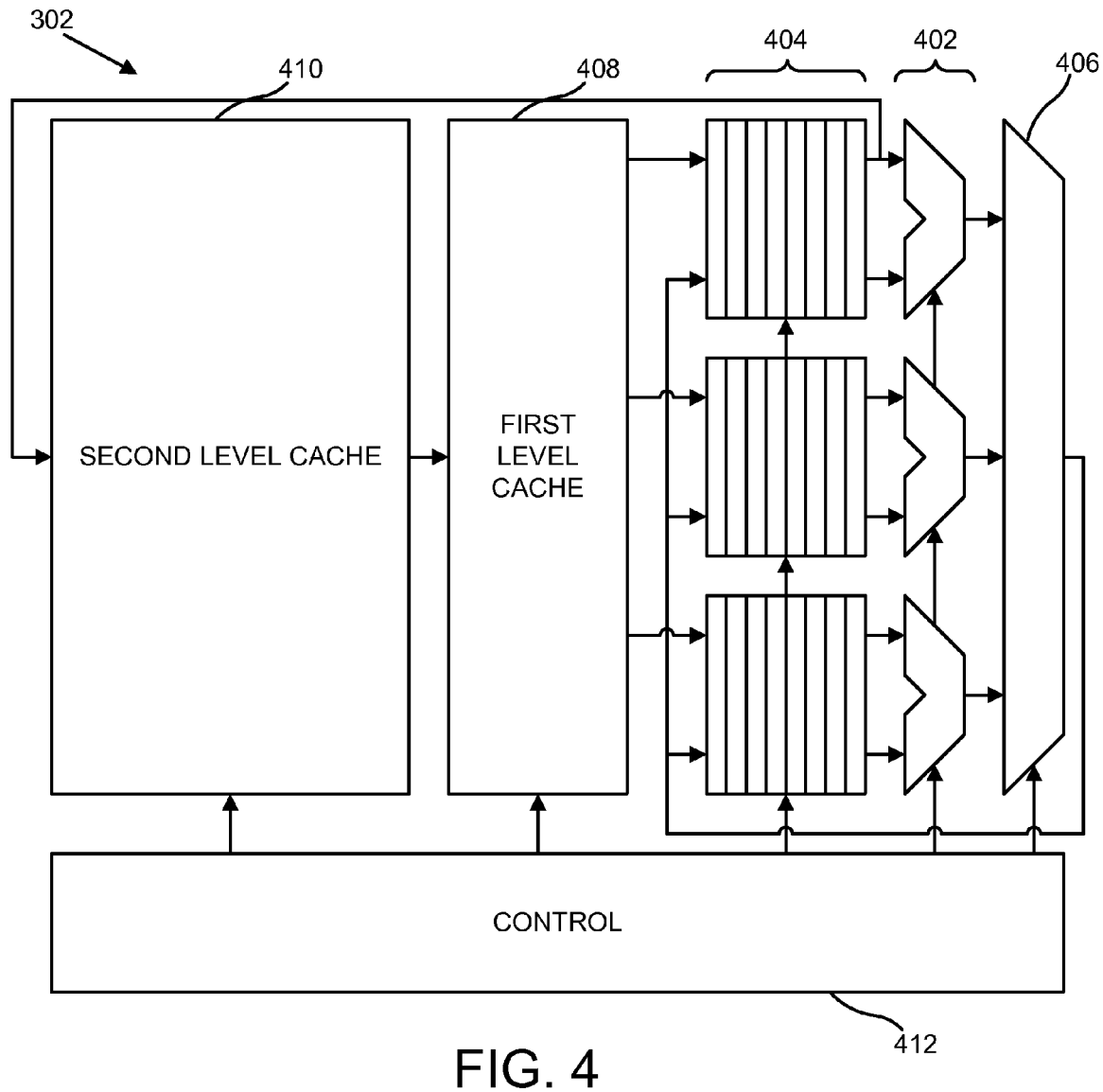
FIG. 4 is a schematic block diagram of a high-power processor.

FIG. 4 is a schematic block diagram of the high-power processor 302. Such a processor may incorporate multiple long-word arithmetic-logic units ("ALUs") 402 fed by multiple long-word register arrays 404. A register rename facility 406 may be provided to re-order execution results from the long-word ALUs 402 so as to achieve superscalar performance. In an embodiment, one or more of the long-word ALUs 402 may have specialized functions, such as floating-point arithmetic.

The performance of the high-power processor 302 may also be greatly enhanced by having multiple levels of large-capacity caches, including a first-level cache 408 and an even larger second-level cache 410. As shown, the first-level cache 408 may provide dedicated read ports to each of the multiple long-word ALUs 402.

Complex control logic 412 is required for the high-power processor 302. Extensive control circuitry is required for register renaming. The complex control logic 412 may also include one or more microcode engines, each with an associated microstore array, for control of the multiple long-word ALUs. Multiple-level cache management also adds significantly to the complex control logic 412. A commensurately large clock generation and distribution network also constitutes a sizable portion of the complex control logic 412.

Even with power-saving strategies such as temporarily shutting down unused circuitry, throttling the clock rate, and the like, significant power may be consumed by the high-power processor 302. A significant power draw may be required just to maintain the contents of the long-word register arrays 406, the large first-level cache 408, and the even larger second-level cache 410.

Figure 5:
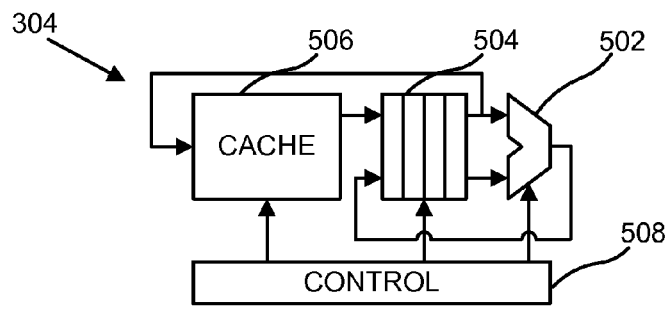
FIG. 5 is a schematic block diagram of a low-power processor.

FIG. 5 is a schematic block diagram of the low-power processor 304. As the comparatively smaller size of the block diagram itself suggests, far less circuitry is required than for the high-power processor 304. There is a single ALU 502, with a word length half that of the long-word ALUs 402. Similarly, there is a single register array 504, with half as many registers and half the word length of the long-word register arrays 404. The register array 504 is fed from a single port of a single, smaller cache 506. The low-power processor 304 also has a simpler scalar architecture, and thus does not require the register rename facility 406, leading to a much smaller amount of control logic 508.

It will be apparent to one of skill in the art that the foregoing embodiments of high-power processor 302 and a low-power processor 304 are merely two points along a spectrum of processor types. By scaling the cache 506, register array 504, ALU 502 and/or other facilities, various other processor types of differing predetermined power consumption can be readily realized.

In spite of the substantial differences of scale between the high-power processor 302 and the low-power processor 304, full binary compatibility, and hence functional interchangeability, is maintained. If necessary, emulation may be employed to achieve the necessary compatibility. For example, firmware routines may be provided for the low-power processor 304 to replicate the functionality of microcode routines in the complex control logic 412 of the high-power processor 302. Even if the high-power processor 302 and low-power processor 304 are of completely different native architectures, firmware-based binary translation or other emulation methods such as interpretation and the like can be employed to achieve the full compatibility required to transparently and interchangeably support the software stack of the computer 200.

Figure 6:
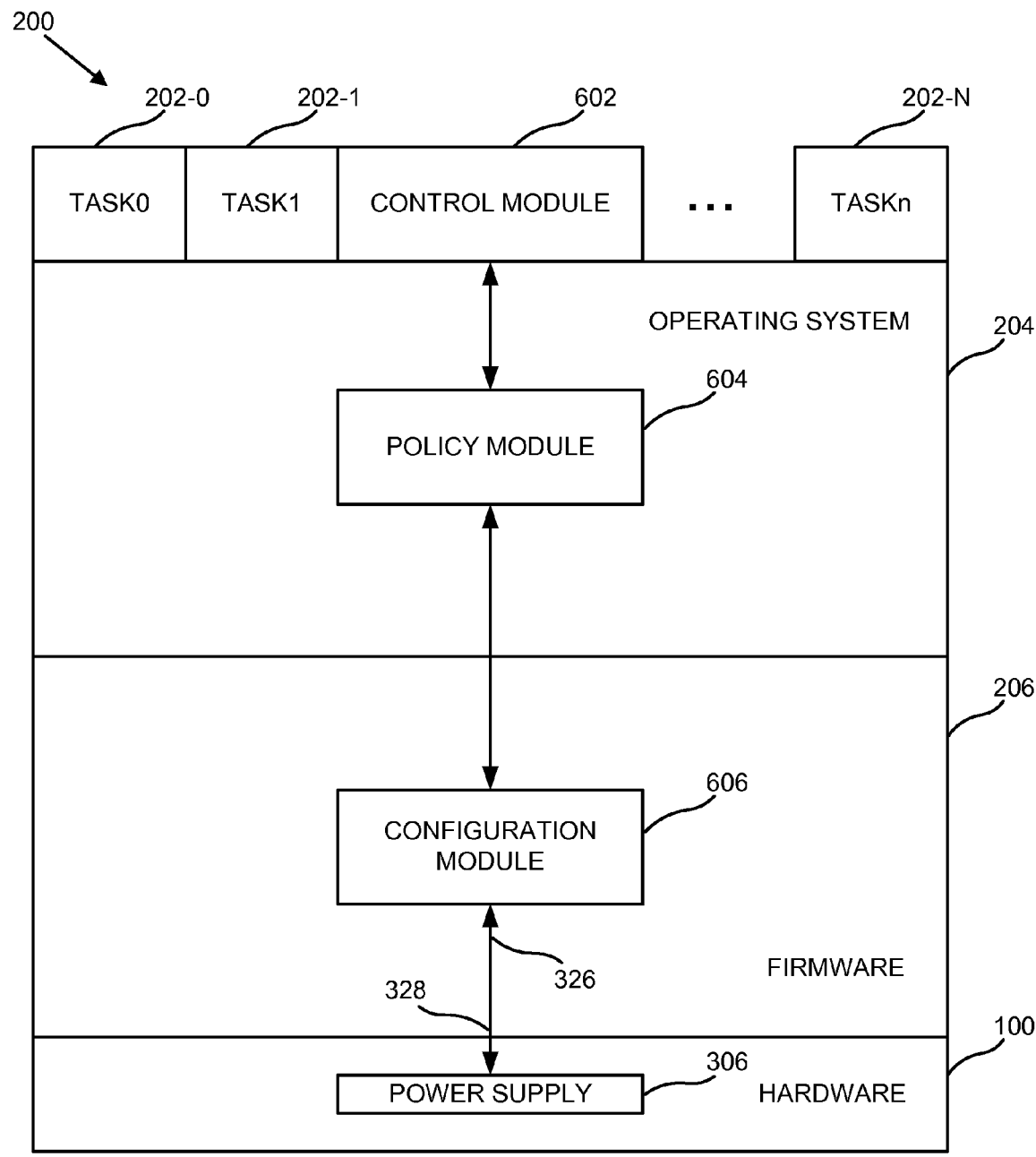
FIG. 6 is a schematic block diagram illustrating one embodiment of a system of the present invention.

FIG. 6 is a schematic block diagram illustrating one embodiment of a system of the present invention within the framework of the computer 200, comprising a control module 602, a policy module 604, and a configuration module 606. These modules work together to manage the power supply 306 of the hardware platform 100 through an interface including the AC-detected signal 326 and the select-high signal 328. In addition to the particular embodiment shown, any the foregoing modules or portions thereof may alternatively reside within the tasks 202, the operating system 204, the firmware 206, and/or the hardware 100.

The control module 602 is activated on the computer 200 in response to an event, and enters a standby state if the computer 200 is not already in the standby state. The standby state may also be referred to as an S3 state, a suspend state, or the like. In one embodiment, the control module 602 may be a background application or other species of task 202.

The policy module 604 detects a power source of a predetermined type connected to the computer 200 and comprises a power policy for the power source. The predetermined types of power sources may include an AC adapter 314, a battery 318, and the like. In one embodiment, the power policy may comprise operating system 204 power options properties, such as are provided by the Windows operating system. The power policy may be customized by the user by specifying the power options properties.

The configuration module 606 is activated by the control module 602 by means of entry into the standby state and switches the hardware platform 100 to one or more processors 102 of a predetermined power consumption as dictated by the power policy and exits the standby state. The processors 102 may include a high-power processor 302, a low-power processor 304, and so forth. In one embodiment, the configuration module may comprise table-driven firmware 206, such as the Advanced Configuration and Power Interface ("ACPI"). The power policy may be overridden by a user. The override may be communicated to the configuration module 606 from the control module 602 in response to a user action.

Figure 7:
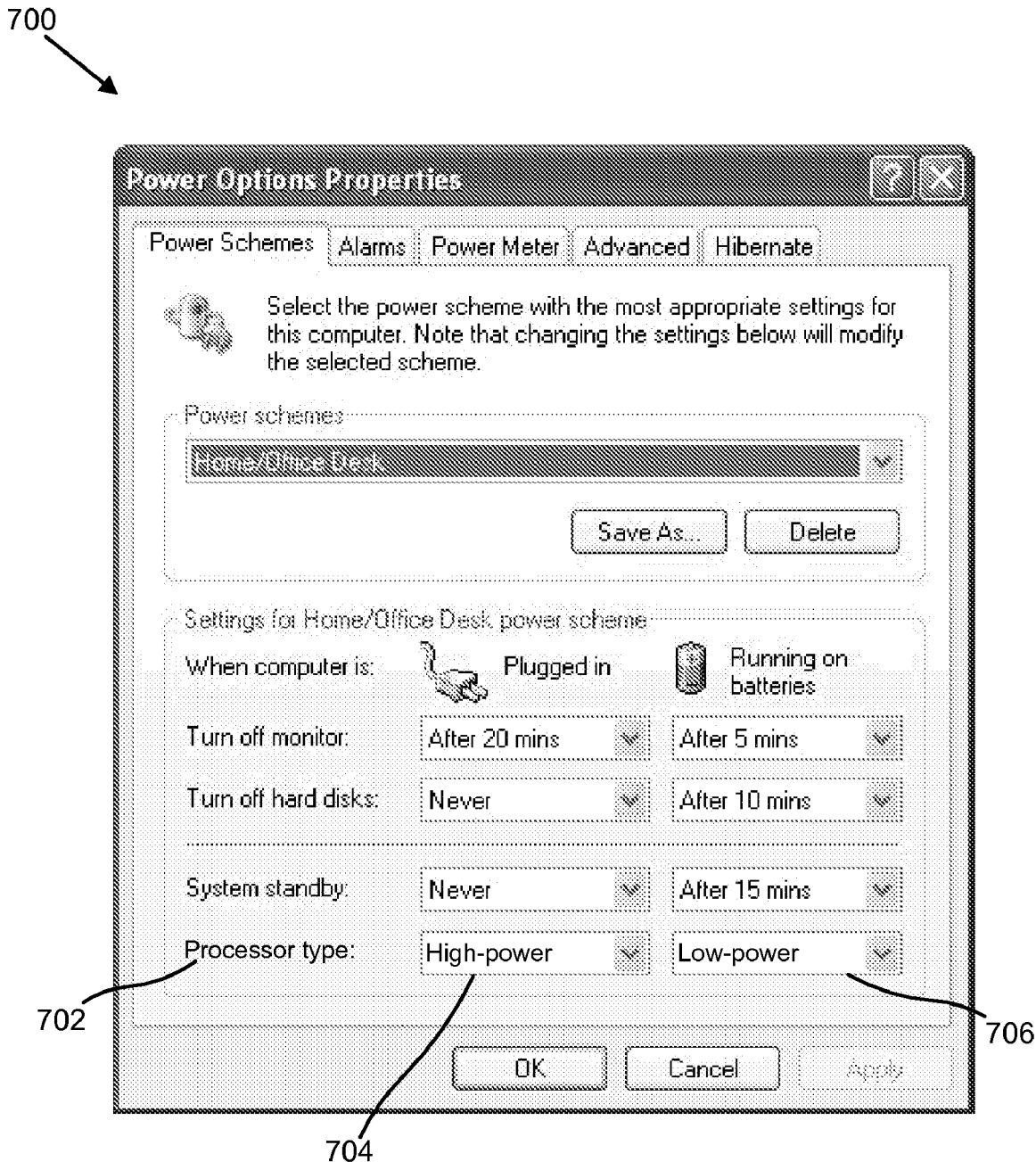
FIG. 7 is one embodiment of a graphical user interface for specifying a power policy in accordance with the present invention.

FIG. 7 is one embodiment of a graphical user interface 700 for specifying a power policy in accordance with the present invention. Specifically, an augmentation of the Windows power options properties is shown. A similar interface may be provided for other operating systems 204 as well. A new property, processor type 702, has been added. The processor type 702 may be specified in an AC adapter field 704 for the case in which the hardware platform 100 is powered by the AC adapter 314, as indicated by presence of the AC-detected signal 326. In this case, the high-power processor 302 has been specified. The processor type 702 may be specified in a battery field 706 for the case in which the hardware platform 100 is powered by the battery 318, as indicated by absence of the AC-detected signal 326. In this case, the low-power processor 304 has been specified. In a further embodiment, the interface 700 may be expanded to include other power source types and processor types.

Figure 8:
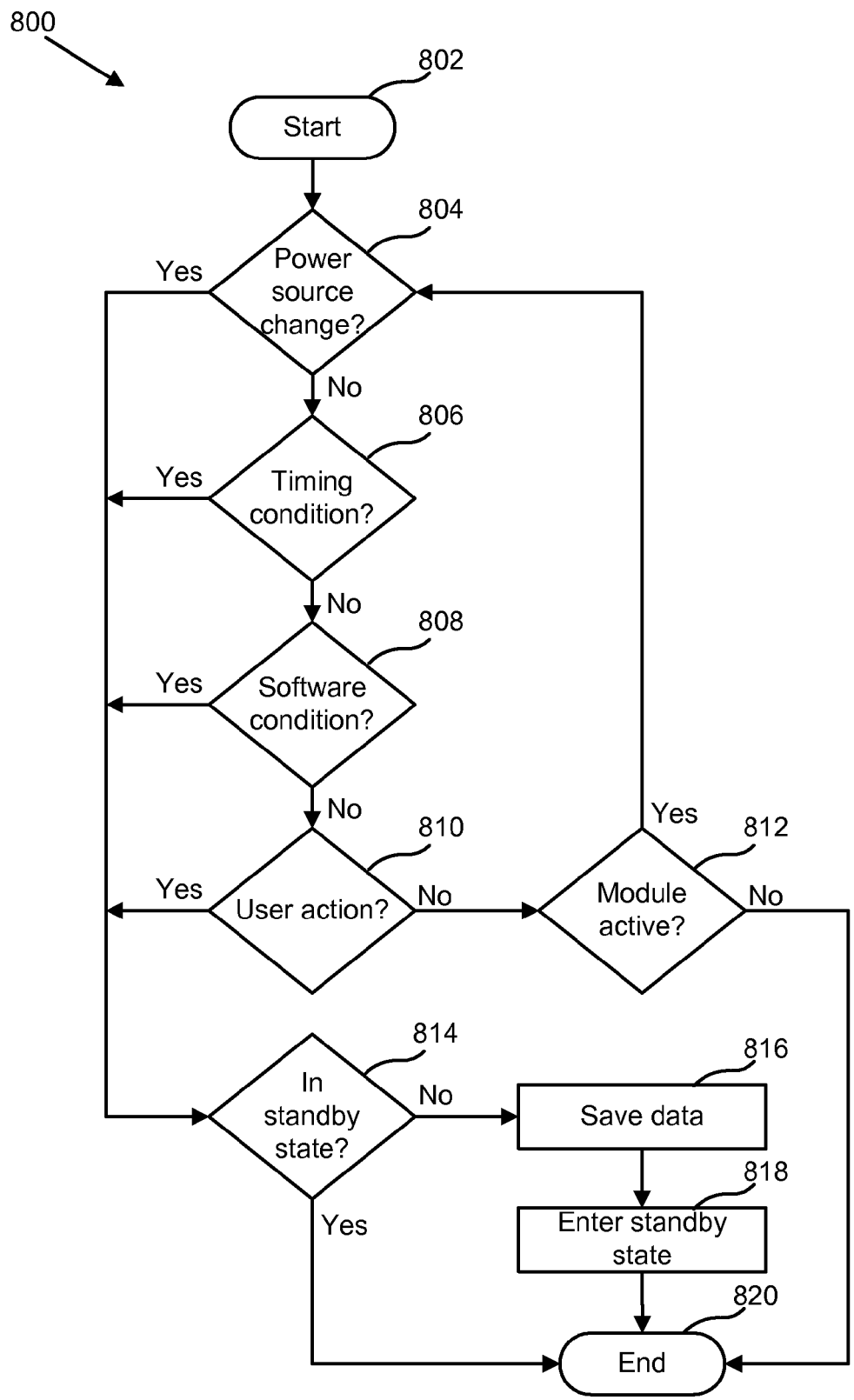
FIG. 8 is a schematic flow chart diagram illustrating one embodiment of a method for a control module in accordance with the present invention.

FIG. 8 is a schematic flow chart diagram illustrating one embodiment of a method 800 for the control module 602 in accordance with the present invention. The method 800 starts 802 and checks for a number of events including a power source change 804, a timing condition 806, a software condition 808, a user action 810, and so forth. The software condition 808 may comprise an operating system 204 condition, such as system idle time exceeding a certain percentage, a firmware 206 condition, such as a BIOS message regarding system temperature exceeding a certain threshold, a system management interrupt ("SMI"), and the like. The user action 810 may comprise a keystroke sequence, the closing and opening of a notebook lid, and the like. The user action 810 may also specify an explicit override of the power policy.

If none of the foregoing events is detected then checking continues so long as the control module 602 is active 812, starting over with the power source change event 804. Otherwise the method 800 ends 820. If one of the foregoing events is detected and the computer 200 is already in standby state 814, then the method 800 ends 820. If the computer 200 is not in standby state 814, then any necessary data to preserve the system state is saved 816, standby state is entered 818, and the method 800 ends 820.

Figure 9:
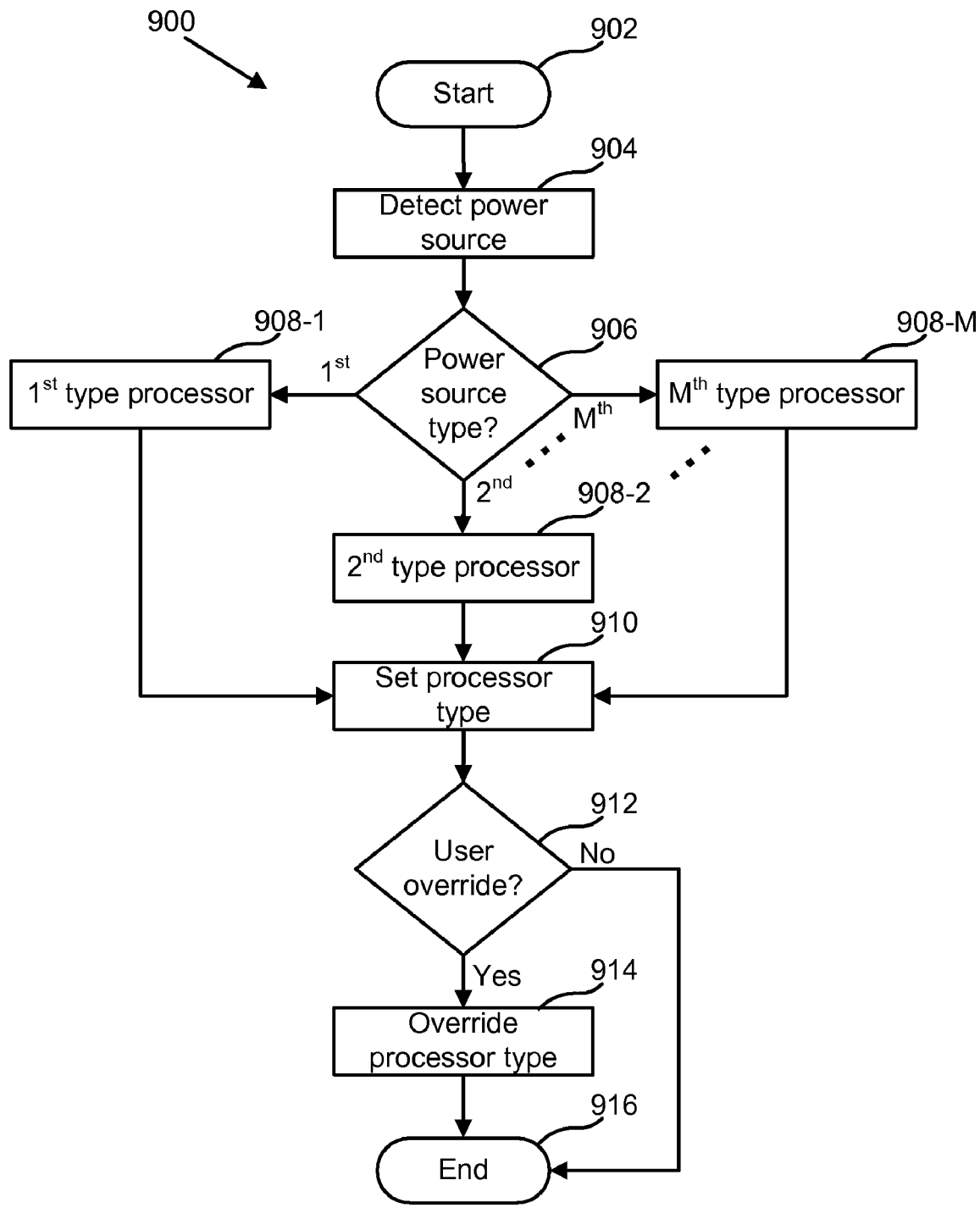
FIG. 9 is a schematic flow chart diagram illustrating one embodiment of a method for a policy module in accordance with the present invention.

FIG. 9 is a schematic flow chart diagram illustrating one embodiment of a method 900 for the policy module 604 in accordance with the present invention. The method 900 starts 902 and detects 904 the power source type, such as may be indicated 906 by the AC-detected signal 326 or the like. If the power source is of a first type, such as the AC adapter 314, then a first type of processor is dictated 908-1 by the power policy, such as a high-power processor 302. If the power source is of a second type, such as the battery 318, then a second type of processor is dictated 908-2 by the power policy, such as a low-power processor 304. Other power source types may be indicated 906, up to an Mth power source type for which an Mth type of processor is dictated 908-M by the power policy. The processor type to be configured is set 910 as dictated 908 by the power policy. If no user override was previously specified, then the method 900 ends 916. Otherwise, the processor type to be configured is overridden 914 per the user override specification, and the method 900 ends 916.

Figure 10:
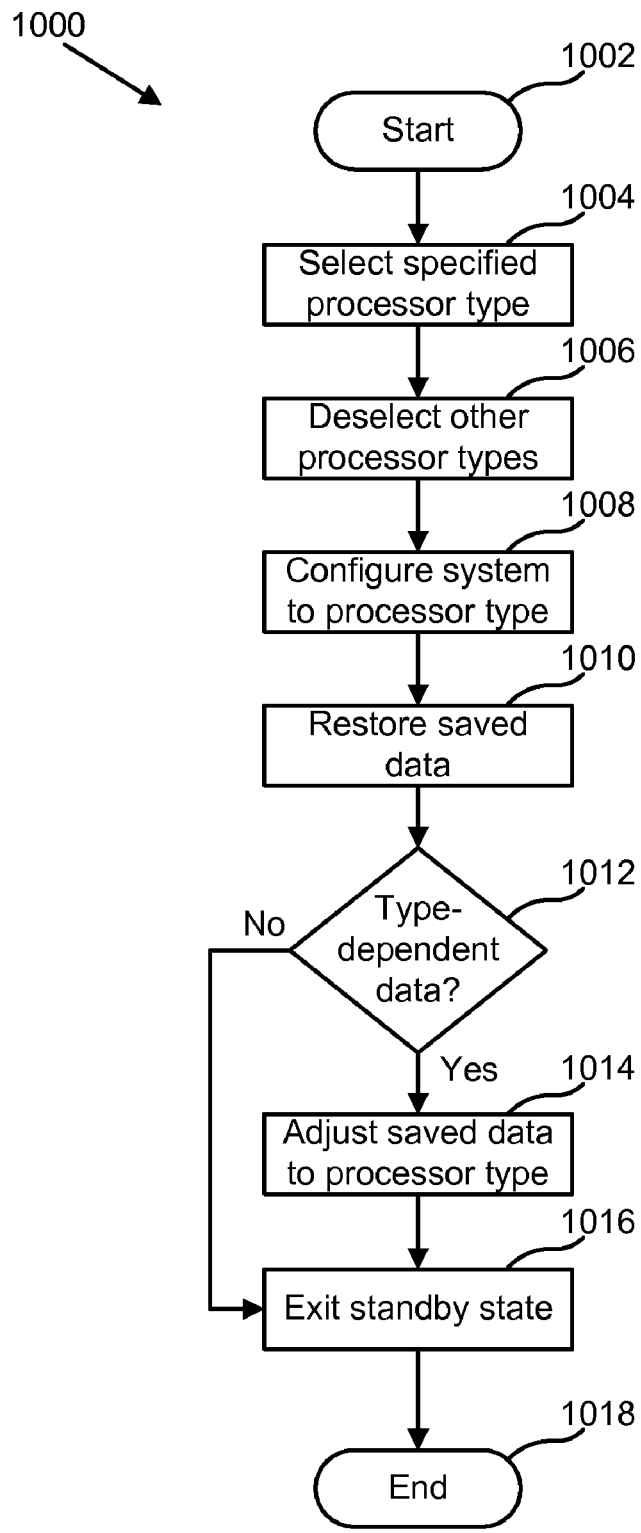
FIG. 10 is a schematic flow chart diagram illustrating one embodiment of a method for a configuration module in accordance with the present invention.

FIG. 10 is a schematic flow chart diagram illustrating one embodiment of a method 1000 for the configuration module 606 in accordance with the present invention. The method 1000 starts 1002 and the processor type to be configured as determined by the policy module 604 is selected 1004. All other processor types are deselected 1006 for configuration. In one embodiment, the selection 1004 and deselection 1006 may comprise the populating of the appropriate ACPI tables. Other system parameters may also need to be configured 1008 in a manner consistent with the selected 1004 processor type. For example, a high-power processor 302 may require a higher fan speed. Data that was previously saved 816 is then restored 1010. If any of the data is dependent 1012 on the selected 1004 processor type, then it is adjusted 1014 accordingly. Processor context data which was saved 816 when a different type of processor was previously configured may need to be adjusted 1014 to conform to the type of processor selected 1004 to be configured. For example, configuration registers for the previously configured processor type may differ from those of the currently selected 1004 processor type. Standby state is then exited 1016, causing the selected 1004 processor type to be configured. For example, if the high-power processor 302 is selected 1004, then the select-high signal 328 would be asserted. At that point the method 1000 ends 1018.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a control module that is activated on a computer in response to an event and enters a standby state if the computer is not already in the standby state;
   a policy module that detects a power source of a predetermined type connected to the computer and comprises a power policy for the power source; and
   a configuration module activated by the control module that switches to one or more processor types of a predetermined power consumption as dictated by the power policy, restores context data that was previously saved, adjusts the context data to conform to the processor type and exits the standby state
   wherein the control module, the policy module, and the configuration module comprise one or more of logic hardware and executable code, the executable code stored on one or more computer-readable storage devices.

2. The apparatus of claim 1, wherein the event is selected from the set consisting of a change of the power source, a timing condition, an operating system condition, a firmware condition, an SMI, and a user action.

3. The apparatus of claim 1, wherein the power policy may be overridden by a user.

4. The apparatus of claim 1, wherein the control module comprises a background application.

5. The apparatus of claim 1, wherein the policy module comprises operating system power options properties.

6. The apparatus of claim 1, wherein the configuration module comprises table-driven firmware.

7. A system comprising:
   a computer having two or more processors of differing power consumption;
   a control module that is activated on the computer in response to an event and enters a standby state if the computer is not already in the standby state;
   a policy module that detects a power source of a predetermined type connected to the computer and comprises a power policy for the power source wherein the power policy dictates one or more processors of higher power consumption for a more abundant type of power source and dictates one or more processors of lower power consumption for a less abundant type of power source; and
   a configuration module activated by the control module that switches to one or more processor types of a predetermined power consumption as dictated by the power policy, restores context data that was previously saved, adjusts the context data to conform to the processor type and exits the standby state
   wherein the control module, the policy module, and the configuration module comprise one or more of logic hardware and executable code, the executable code stored on one or more computer-readable storage devices.

8. The system of claim 7, wherein the more abundant type of power source comprises an AC adapter and the less abundant type of power source comprises a battery.

9. The system of claim 7, wherein the power policy may be overridden by a user.

10. The system of claim 7, wherein the computer comprises a notebook.

11. The system of claim 10, wherein the event comprises closing and opening the lid of the notebook.

12. The system of claim 7, wherein the two or more processors of differing power consumption achieve binary compatibility through emulation where necessary.

13. A computer program product comprising a computer readable medium having computer usable program code executable to perform operations, the operations of the computer program product comprising:
    checking for an event and proceeding with the operations on a computer in response to the event;
    entering a standby state if the computer is not already in the standby state;
    detecting a power source of a predetermined type connected to the computer;
    switching to one or more processor types of a predetermined power consumption as dictated by a power policy for the power source;
    restoring context data that was previously saved;
    adjusting the context data to conform to the processor type; and
    exiting the standby state.

14. The computer program product of claim 13, wherein the event is selected from the set consisting of a change of the power source, a timing condition, an operating system condition, a firmware condition, an SMI, and a user action.

15. The computer program product of claim 13, wherein the power policy dictates one or more processors of higher power consumption for a more abundant type of power source and dictates one or more processors of lower power consumption for a less abundant type of power source.

16. The computer program product of claim 15, wherein the more abundant type of power source comprises an AC adapter and the less abundant type of power source comprises a battery.

17. The computer program product of claim 13, wherein the power policy may be overridden by a user.

18. A machine-implemented method comprising the steps of:
    detecting a power source of a predetermined type connected to a computer;
    switching to one or more processor types of a predetermined power consumption as dictated by a power policy for the power source;
    restoring context data that was previously saved; and
    adjusting the context data to conform to the processor type.

19. The method of claim 18, further comprising the steps of:
    entering a standby state if the computer is not already in the standby state; and
    exiting the standby state.

20. The method of claim 18, wherein the method is activated in response to an event.

21. The method of claim 20, wherein the event is selected from the set consisting of a change of the power source, a timing condition, an operating system condition, a firmware condition, an SMI, and a user action.

22. The method of claim 18, wherein the power policy dictates one or more processors of higher power consumption for a more abundant type of power source and dictates one or more processors of lower power consumption for a less abundant type of power source.

23. The method of claim 22, wherein the more abundant type of power source comprises an AC adapter and the less abundant type of power source comprises a battery.

24. The method of claim 18, wherein the power policy may be overridden by a user.

* * * * *